United States Patent
Koska

(10) Patent No.: US 7,465,401 B2
(45) Date of Patent: Dec. 16, 2008

(54) TREATMENT OF CHLORAMINATED WATER

(75) Inventor: Laszlo Koska, Beldon (AU)

(73) Assignee: Water Corporation, Leederville (AU)

(*) Notice: Subject to any disclaimer, the term of this patent is extended or adjusted under 35 U.S.C. 154(b) by 0 days.

(21) Appl. No.: 10/565,268

(22) PCT Filed: Jul. 9, 2004

(86) PCT No.: PCT/AU2004/000925

§ 371 (c)(1),
(2), (4) Date: Sep. 19, 2006

(87) PCT Pub. No.: WO2005/012189

PCT Pub. Date: Feb. 10, 2005

(65) Prior Publication Data

US 2007/0065333 A1  Mar. 22, 2007

(30) Foreign Application Priority Data

Jul. 25, 2003  (AU) .............. 2003903858

(51) Int. Cl.
C02F 1/50  (2006.01)
C02F 1/76  (2006.01)

(52) U.S. Cl. .............. 210/748; 210/754; 210/764; 422/37; 424/630; 424/661

(58) Field of Classification Search .......... 210/755
See application file for complete search history.

(56) References Cited

U.S. PATENT DOCUMENTS

| | | | | |
|---|---|---|---|---|
| 1,989,380 A | * | 1/1935 | Romans | 210/755 |
| 3,702,298 A | * | 11/1972 | Zsoldos et al. | 210/754 |
| 4,614,595 A | * | 9/1986 | Azzarella et al. | 210/754 |
| 5,373,025 A | * | 12/1994 | Gay | 514/642 |
| 5,858,246 A | * | 1/1999 | Rafter et al. | 210/754 |
| 5,954,939 A | * | 9/1999 | Kanekuni et al. | 205/742 |
| 6,093,422 A | * | 7/2000 | Denkewicz et al. | 424/618 |
| 6,565,893 B1 | * | 5/2003 | Jones et al. | 424/616 |
| 6,824,794 B2 | * | 11/2004 | Ring et al. | 424/638 |
| 7,311,878 B2 | * | 12/2007 | Singleton et al. | 422/37 |
| 2002/0125196 A1 | | 9/2002 | Rosenblatt et al. | 210/721 |
| 2005/0211643 A1 | * | 9/2005 | Phillips et al. | 210/753 |

FOREIGN PATENT DOCUMENTS

GB  1571204  7/1980

* cited by examiner

Primary Examiner—Peter A. Hruskoci
(74) Attorney, Agent, or Firm—Clark & Brody

(57) ABSTRACT

A method of treating chloraminated water by adding copper ions is disclosed. The addition of copper ions inhibits microbial action in the water, thus reducing nitrification of ammonia and maintaining chloramine levels.

11 Claims, 2 Drawing Sheets

TREATMENT OF CHLORAMINATED WATER

FIELD OF THE INVENTION

Figure 1:
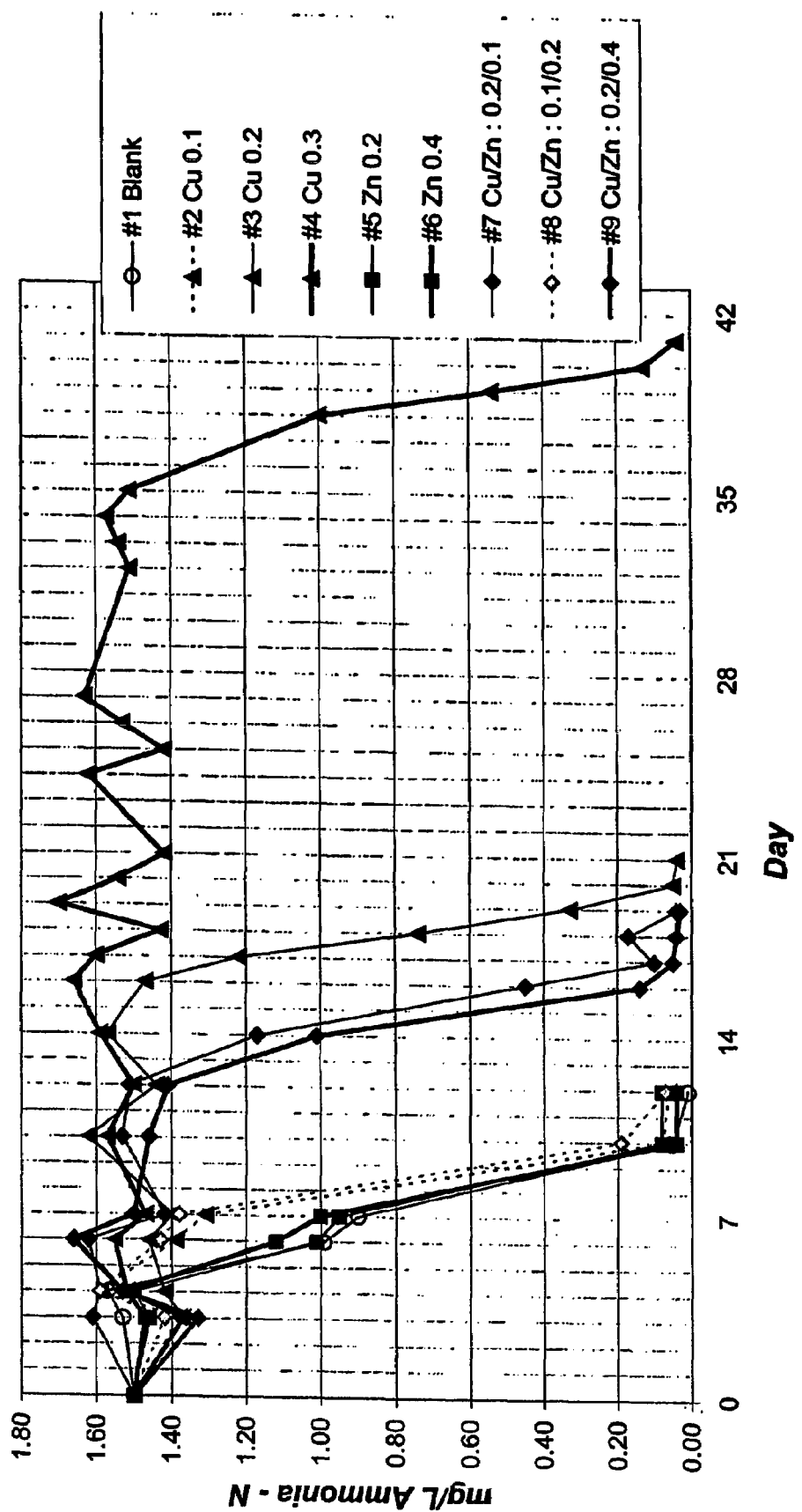

The present invention relates to a method of treating chloraminated water.

BACKGROUND TO THE PRESENT INVENTION

It is known to treat reticulated water with chlorine and ammonia in order to produce chloramines, principally monochloramine. Monochloramine is used as a disinfectant within the water. Monochloramine is produced according to the following reactions:

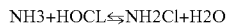

The ration of chlorine:ammonia-nitrogen in the above reactions is approximately 5:1. The reactions may take place in the presence of excess aqueous ammonia, for instance in a concentration of about 0.2 mg/L.

One problem which arises in the use of chloramines in water is that the chloramines have a propensity to decay. This decay can be a simple chemical decay, causing the equilibrium in the second equation above to move to the left. This chemical decay is very slow, and free ammonia is formed as chlorine levels are being reduced. Tests have revealed that this decay can reach extremely high levels, due to nitrification of ammonia. Nitrification occurs when ammonia is oxidised to nitrite by microbiological organisms, either within the water or on an inner surface of pipes. The nitrite is then further oxidised to nitrate by other organisms.

The microbiological organisms generally form a biofilm. Once a biofilm is established, nitrification can continue, even in the presence of high levels of monochloramine (levels greater than 2 mg/L, expressed as chlorine).

The most common method of ameliorating this problem is to periodically change the disinfectant within the reticulation system from chloramines to free chlorine. This is achieved by the introduction of chlorine into the water. This has the effect of destroying the biofilm.

Several problems are associated with this method. These include the presence in the newly chlorinated water of an undesirable level of disinfectant by-products, in addition to a noticeable change in the taste and smell of the water. Should the quantity of added chlorine not be sufficient, it can actually reduce the effective chlorine in the water, resulting in inadequate disinfection.

Further, where water is being reticulated over a long distance, a periodic change from chloramination disinfection to free chlorine disinfection requires the presence of significant treating infrastructure at locations along the distance.

Other methods have been proposed in order to ameliorate the problem of nitrification. They include the addition of chlorite ions and also significantly increasing pH. None of these solutions have thus far proved satisfactory.

Consequently, it is currently necessary to retreat chloraminated water being reticulated over long distances at various stages along the reticulation path. This requires the addition of farther chlorine and/or ammonia to bring the amount of chloramines or chlorine in the water back to effective levels.

The present invention attempts to overcome at least in part some of the aforementioned propensity of chloramines in treated water to decay.

SUMMARY OF THE PRESENT INVENTION

In accordance with one aspect of the present invention there is provided a method of treating water containing chloramines as a disinfectant, characterised in that the method comprises the step of introducing copper ions to the water. Advantageously, the dissolved copper ions restrict microbial growth in the water, whilst being held in solution by complexing with ammonia Preferably, copper is added in the concentration range of 0.1 to 2 mg/L, more preferably in the range of 0.2 to 0.5 mg/L.

In accordance with a second aspect of the present invention there is provided a method of substantially eliminating a biofilm formed in bodies of water or vessels or pipes containing bodies of water, characterised in that the method comprises the steps of introducing chlorine, ammonia and copper into the water.

BRIEF DESCRIPTION OF THE ACCOMPANYING DRAWINGS

Figure 2:
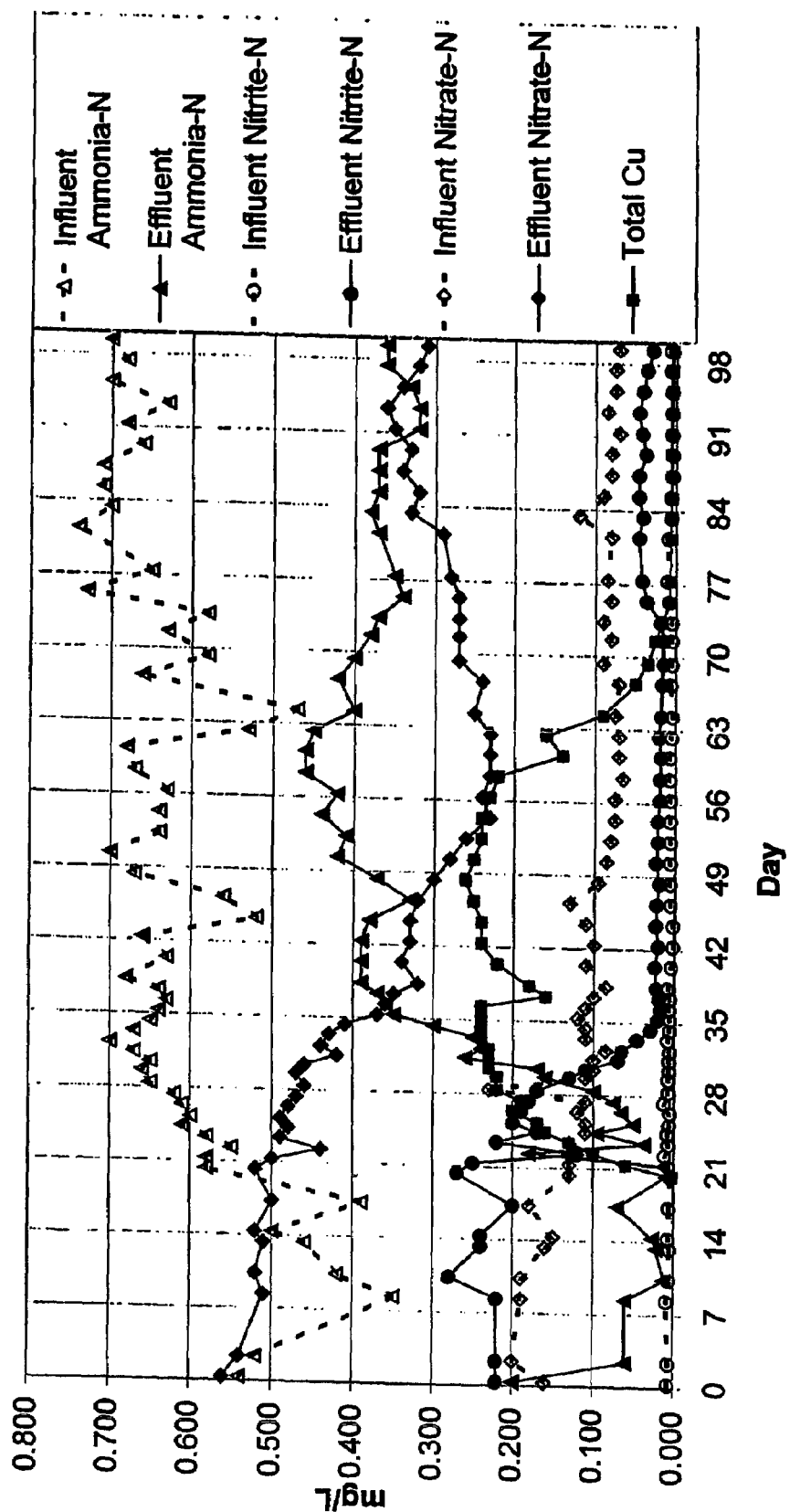

The present invention will now be described with reference to the accompanying drawings, in which:

FIG. 1 is a chart showing the results of the experiment detailed in Example 1; and FIG. 2 is a chart showing the results of the experiment detailed in Example 2.

DESCRIPTION OF THE INVENTION

Copper ions are used to control and eliminate a number of microorganisms in water. Previously, it has only been possible to use copper ions in localised environments such as for the control of algae in reservoirs and swimming pools.

Copper ions are not used for the treatment of reticulated drinking water as copper precipitates from water.

The present invention relies on the combination of ammonia, chlorine and copper ions within reticulated water. The three substances interrelate to provide a useful result.

The ammonia and chlorine combine with the water as per the above equation to produce monochloramine. The monochloramine acts to disinfect the water.

The copper ions act to restrict microbial growth in the water and in pipes. This in turn reduces the nitrification of the ammonia.

The copper ions combine with the ammonia to form complex ions. This has the effect of maintaining the copper in solution, and restricts the propensity for the copper to precipitate out of the water as copper hydroxide or other insoluble compounds.

The combined effect of the chemical combination is that required monochloramine and ammonia levels can be maintained in reticulated water supplies for considerably longer periods, and over larger distances through water reticulation systems.

The present invention has been the subject of significant research, as detailed below.

EXAMPLE 1

After the elimination of chlorine, a chloraminated water bulk sample was dosed with excess ammonia to achieve 1.50 mg/L ammonia-N concentration. The bulk sample was dosed with ammonia oxidising bacteria, cultured from a chloraminated system.

The bulk sample was then subsampled into 9 separate portions. These portions were dosed as follows:

1. no dosage
2. 0.1 mg/L copper
3. 0.2 mg/L copper
4. 0.3 mg/L copper
5. 0.2 mg/L zinc
6. 0.4 mg/L zinc
7. 0.2 mg/L copper, 0.1 mg/L zinc
8. 0.1 mg/L copper, 0.2 mg/L zinc
9. 0.2 mg/L copper, 0.4 mg/L zinc.

The samples were measured over subsequent days to determine the ammonia levels. The results are shown in FIG. 1.

The results of this experimented showed the ammonia level beginning to fall after about five days, and falling to a base of level of about 0.1 mg/L after about 10 days, for each of the samples not containing copper. Where 0.1 mg/L of copper was present, these were extended to about seven and 12 days. Where 0.2 mg/L of copper was present, the ammonia level was maintained for about 15 days, and the base level reached after 19 days. Where 0.3 mg/L of copper was present, the ammoina level was maintained for 34 days, with the base level being reached after 40 days.

The presence of zinc in conjunction with the copper appeared to decrease the efficacy of the copper dose.

EXAMPLE 2

In a field trial, a reservoir having a floating cover, and a water detention period of 3.5 days, was dosed with copper sulphate to achieve a copper level of about 0.25 mg/L for a period of six weeks. The levels of ammonia, nitrite and nitrate were measured both at reservoir inlet and outlet. The results are shown in FIG. 2.

The field trial results demonstrated a substantial reduction in both nitrate and nitrite levels at the reservoir outlet, and a substantial increase in the percentage of ammonia "surviving" from inlet to outlet. These results were maintained for a period of 6 to 12 weeks following the substantial exit of copper ions from the water. This suggests a residual effect, caused perhaps by copper which has precipitated or perhaps by a lag time in the re-establishment of a biofilm.

Testing revealed a significant reduction in microbiological activity following the dosing with copper.

Further experimentation has suggested that the nitrification process is temperature dependent. These results suggest that a periodic dosage regime during warm periods of the year may be sufficient to control nitrification, dependant on the ambient conditions.

Current research indicates that concentration of copper in the range of 0.1 to 0.5 mg/L will be complexed by the ammonia present in the water, and will successfully reduce the effects of nitrification. It will be appreciated that copper dosage up to the current Australian Drinking Water Guideline limit of 2 mg/L may be used. This copper may be supplied by the addition of copper salts such as copper sulphate (as described above) or by the use of electrolysis.

As detailed above, it is considered that the dosage of zinc with copper is less effective than the dosage of copper alone. Nonetheless, it is believed that the combination of copper with other metal ions such as silver or tin may prove efficacious.

It is believed that the principal mechanism causing the beneficial effect described above is the action of copper on the biofilm. In an alternative embodiment of the invention, a combination of chlorine, ammonia and copper ions can be added to water having a biofilm in order to substantially eliminate the biofilm. The biofilm may be located of a surface of a body of water, or on an inner surface of vessels or pipes containing bodies of water.

Modifications and variations as would be apparent to a skilled addressee are deemed to be within the scope of the present invention.

The invention claimed is:

1. A method of treating water containing chloramine as a disinfectant, characterised in that the method comprises the step of introducing copper ions to the water, wherein the water is reticulated and the chloramine decays to form free ammonia, and wherein the copper ions combine with the free ammonia to form complex ions which remain in solution.

2. A method of treating water containing chloramine as a disinfectant as claimed in claim 1, characterised in that the copper ions are introduced by the addition of copper salt.

3. A method of treating water containing chloramine as a disinfectant as claimed in claim 1, characterised in that the copper ions are introduced by electrolysis of metallic copper.

4. A method of treating water containing chloramine as a disinfectant as claimed in claim 1, characterised in that the concentration of copper ions in the water is in the range of 0.1 mg/L to 2.0 mg/L.

5. A method of treating water containing chloramine as a disinfectant as claimed in claim 4, characterised in that the concentration of copper ions in the water is in the range of 0.2 mg/L to 0.5 mg/L.

6. A method of treating water containing chloramine as a disinfectant as claimed in claim 5, characterised in that the concentration of copper ions in the water is in the range of 0.2 mg/L to 0.3 mg/L.

7. A method of treating water containing chloramine as a disinfectant as claimed in claim 1, characterised in that the copper ions are continually introduced into the water so as to maintain a predetermined copper concentration.

8. A method of treating water containing chioramine as a disinfectant as claimed in claim 1, characterised in that the copper ions are periodically introduced into the water so as to bring the copper ion concentration in the water to a predetermined level for a predetermined period of time.

9. A method of treating water containing chloramine as a disinfectant as claimed in claim 1, characterised in that the method comprises the further step of introducing silver ions into the water.

10. A method of treating water containing chloramine as a disinfectant as claimed in claim 1, characterised in that the method comprises the further step of introducing tin ions into the water.

11. A method of substantially eliminating biofllm formed in bodies of reticulated water or vessels or pipes containing bodies of reticulated water, characterised in that the method comprises the steps of introducing chlorine, ammonia and copper ions into the water wherein said chlorine and ammonia produce chloramine, which decays to form free ammonia, and wherein the copper ions combine with the free ammonia to form complex ions which remain in solution.

* * * * *